May 18, 1937.  S. G. RABER  2,080,504
ELECTRICAL APPARATUS
Filed July 21, 1936

INVENTOR
Samuel G. Raber.
BY
ATTORNEY

Patented May 18, 1937

2,080,504

UNITED STATES PATENT OFFICE 2,080,504

ELECTRICAL APPARATUS

Samuel G. Raber, Youngstown, Ohio, assignor to The Union Switch & Signal Company, Swissvale, Pa., a corporation of Pennsylvania Application July 21, 1936, Serial No. 91,662

18 Claims. (Cl. 171—97)

My invention relates to electrical apparatus and particularly to apparatus of the type involving a direct current load, a source of alternating current connected with the load through a rectifier, and an emergency or reserve source of direct current for the operation of said load in the event of failure of current from the rectifier.

One feature of my invention is the provision, in a combination of this character, of means for connecting the two sources and the load in such a manner that the emergency source normally furnishes substantially no current to the load but will automatically furnish current to the load in the event of failure of the supply of current by the rectifier.

Another feature of my invention is the provision of means for preventing a charge from being delivered to the emergency source when the voltage delivered by the rectifier rises, which rise might occur, for example, due to a decrease in load.

I will describe two forms of apparatus embodying my invention, and will then point out the novel features thereof in claims.

Figure 1:
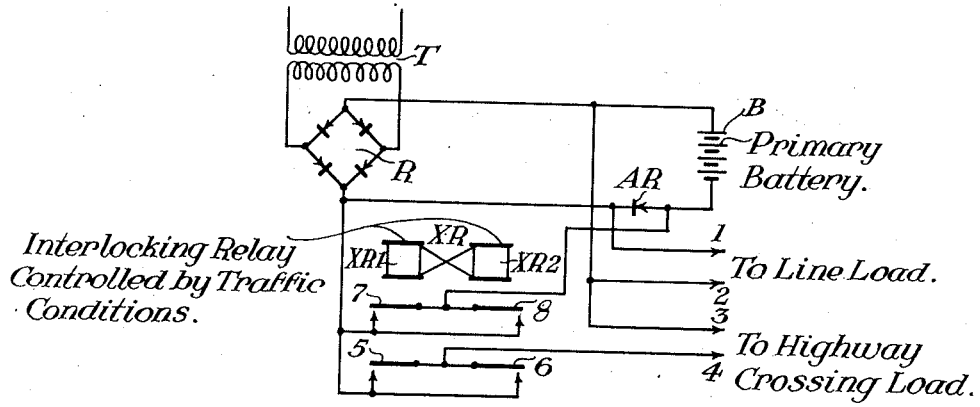
Figure 2:
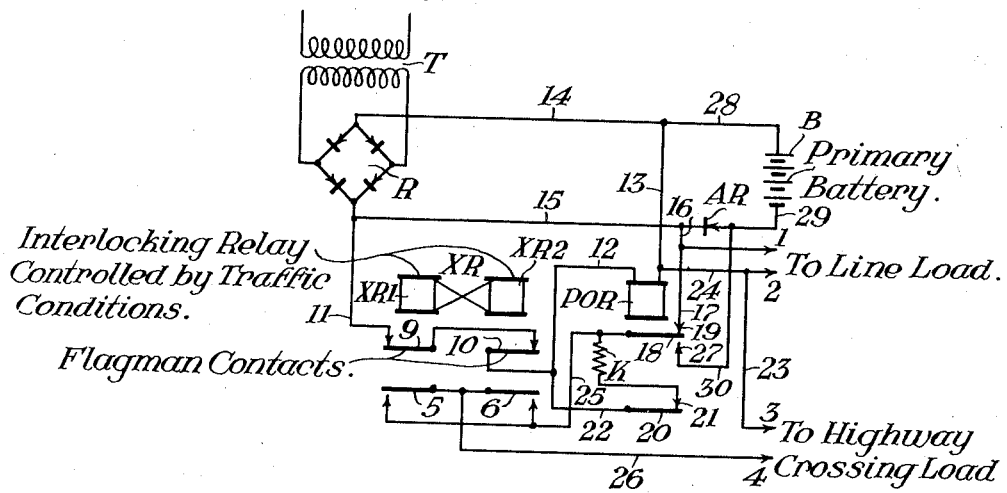

In the accompanying drawing, Fig. 1 is a diagrammatic view showing one form of apparatus embodying my invention. Fig. 2 is a diagrammatic view showing a modified form of the apparatus of Fig. 1, and also embodying my invention.

Similar reference characters refer to similar parts in both figures of the drawing.

Referring to Fig. 1 of the drawing, the reference character T designates a transformer, the primary of which is constantly supplied with alternating current from a suitable source which is not shown in the drawing. The secondary of transformer T is connected with the input terminals of a full-wave rectifier R. The output terminals of this rectifier are constantly connected with a relatively light load such as a "line load" having terminals 1 and 2, and are at times connected with a relatively heavy load, such as a highway crossing signal, having terminals 3 and 4. The heavy load is connected with the rectifier R by means of contact 5 or contact 6 of an interlocking relay XR, although any other suitable type of switching device can be used for this purpose. The transformer T and rectifier R constitute the normal source of direct current for energizing both of these loads.

The reference character B designates a reserve source of direct current which will usually be a primary battery. This battery is connected in parallel with the output terminals of the rectifier R through an auxiliary rectifier or asymmetric unit AR which is poled in such a direction as to prevent the output current from the rectifier R from flowing through the battery. That is to say, it is assumed that the lower terminal of battery B is positive, and that the lower output terminal of rectifier R is likewise positive. It will be seen, therefore, that the output current from rectifier R cannot flow through battery B because of the opposition offered by the asymmetric unit AR but that current from battery B may flow through this unit AR into one or both loads, without hindrance. The asymmetric unit AR may preferably be of the copper-oxide type such as disclosed in Letters Patent of the United States No. 1,640,335 granted to Lars O. Grondahl on August 23, 1927, although any other suitable type of asymmetric conductor may be employed.

The line load may comprise one or more line relays which have high resistance windings and consequently require only a small operating current. Since the resistance of asymmetric unit AR in the high-current direction is very low, the voltage drop across this unit when the battery B is feeding the line load is inappreciable. The highway crossing load will usually comprise a number of low resistance lamps which provide the well-known crossing indication and which require substantially full voltage for producing an indication of the required intensity. Consequently, at such times as the battery B is called upon to supply the heavy load, due, for example, to a failure of the alternating current source, the unit AR is short-circuited over contact 7 or contact 8 of the interlocking relay. This eliminates the voltage drop across this unit which would otherwise result from the flow of the comparatively heavy load current.

The particular apparatus which controls the interlocking relay XR forms no part of my invention and has been omitted from the drawing in order to simplify the disclosure. It will be sufficient to state that upon the entry of a train into the track section with which the interlocking relay is associated, one or the other magnet XR1 or XR2 will become deenergized so that back contacts 5 and 7 or 6 and 8, respectively, will close, thus energizing the highway crossing load as well as short-circuiting the unit AR.

The voltage of battery B is preferably such that the major portion of the highway crossing load is carried by the rectifier R. It is desirable, however, that a slight amount of current be drawn from battery B in order to maintain the battery in an active condition. When the highway crossing load is removed, the output voltage of rectifier R increases appreciably and tends to cause a certain amount of charging current to flow into the battery. If the flow of this current were not checked, the battery voltage would rise to an extent such that excessive voltage would be applied to the highway crossing lamps for a period of time following the release of relay XR. It will be apparent, therefore, that asymmetric unit AR prevents excessive battery voltage thus preventing the premature burning out of the highway crossing lamps and, at the same time, does not interfere with proper voltage being applied to the load upon failure of the alternating current source.

Referring now to Fig. 2, the apparatus of this figure is similar to that shown in Fig. 1, with the exception that I have added a normally energized power-off relay POR for a purpose which will become clear as the description progresses. The relay POR has a pickup circuit which includes the lower terminal of rectifier R, wire 11, the two "flagman" contacts 9 and 10 of relay XR, wire 12, winding of relay POR, and wires 13 and 14, to the upper terminal of rectifier R. The interlocking relay XR is so constructed and adjusted that when magnet XR1 releases, contact 9 will open and contact 5 will close. When magnet XR2 subsequently releases, contact 10 will remain closed and contact 6 will remain open, unless magnet XR1 is reenergized in the meantime. A similar operation takes place if magnet XR2 is the first to release. That is, contact 10 will open but contact 9 will be prevented from opening. It will be apparent, therefore, that the pickup circuit for relay POR will be opened whenever one or the other magnet of relay XR becomes released (which will occur when a train approaches the highway crossing from one or the other direction, respectively) and this pickup circuit will be reclosed as soon as the train clears the crossing, that is, as soon as the respective magnet is again picked up. In this manner, the apparatus is restored to its normal condition more quickly, following a power failure, than would be the case if ordinary front contacts of the interlocking relay and not "flagman" contacts were used.

In addition to the pickup circuit traced above, relay POR also has a holding circuit which includes the output terminals of rectifier R, wires 15, 16, and 17, front contact 18—19 of relay POR, resistor K, front contact 20—21 of relay POR, wires 22 and 12, winding of relay POR, and wires 13 and 14. The resistor K in the holding circuit serves to cut down the energization of relay POR at such times as the pickup circuit is open at contact 9 or contact 10, thus raising the release characteristic and insuring that relay POR will release not only during a failure of the alternating current source but also whenever the voltage across the highway crossing load decreases below a given value as determined by a satisfactory indication being obtained at the crossing. It will be understood, of course, that relay POR will not release if both magnets of relay XR are energized even though there is a failure of the A. C. source. This is because there is then effective an auxiliary pickup circuit for relay POR from battery B which includes wire 29, asymmetric unit AR, wires 15 and 11, contacts 9 and 10, wire 12, winding of relay POR, and wires 13 and 28, to the battery. However, the battery B is ineffective adequately to energize the holding circuit for relay POR and this circuit depends for its effectiveness solely upon the output from rectifier R. This will be clear when it is understood that should the alternating current source fail or its voltage decrease at such a time as contact 9 or contact 10 is open and the highway crossing load is connected, the relatively large voltage drop across the asymmetric unit AR resulting from the flow of the load current from battery B would reduce the battery voltage effective across relay POR below the release point of the relay.

The line load in Fig. 2 is constantly connected with the output terminals of rectifier R and with the battery B through the asymmetric unit AR, as in Fig. 1. Also, the highway crossing load receives energy whenever one or the other magnet of relay XR is deenergized, as before. However, in Fig. 2, the normal energizing circuit for the crossing load includes a front contact of relay POR. This energizing circuit includes the following: load terminal 3, wires 23, 24, 13, and 14, rectifier R, wires 15, 16, and 17, front contact 18—19 of relay POR, wire 25, back contact 5 or 6 of relay XR, and wire 26, to the other terminal 4 of the load.

As pointed out hereinbefore, should the alternating current source fail or its voltage fall below a given value which corresponds to a satisfactory potential across the highway crossing load at such time as this load is effectively connected, then relay POR will release and will close its back contact 18—27. The crossing load will now be transferred to the battery B which will supply current over the following circuit: wires 23, 24, 13, and 28, battery B, wires 29 and 30, back contact 18—27 of relay POR, wire 25, back contact 5 or 6 of relay XR, and wire 26. It will be noted that once relay POR has released, the unit AR is excluded from the circuit between the primary battery and the highway crossing load so that no provision need be made in Fig. 2 for short-circuiting this unit.

When relay POR releases, its stick circuit is interrupted at front contacts 18—19 and 20—21 and this relay will not pick up subsequently until the alternating current power is restored or until the voltage at the relay increases to the proper value, provided, at the same time, that contacts 9 and 10 are both closed. The stick feature of relay POR makes it possible to avoid "bell-ringing action" of the relay which might otherwise occur due to abnormally high resistance developing in some part of the normal energizing circuit for the highway crossing load. Such resistance might cause a drop in voltage sufficient to cause relay POR to release and to transfer the crossing load to the primary battery. However, as soon as this occurred or as soon as the load became disconnected at front contact 18—19, the resultant increase in voltage might again pick up relay POR, only to repeat the cycle. The holding circuit, therefore, insures a positive release of relay POR.

The apparatus which I have disclosed not only economizes battery but does this without the usual disadvantage of an interruption in the line load circuit during the time required to transfer from the normal to the emergency source. Moreover, this apparatus prevents excessive voltage from being built up across the primary battery, thus avoiding injury both to the battery and to the load apparatus connected therewith.

Although I have herein shown and described only two forms of electrical apparatus embodying my invention, it is understood that various changes and modifications may be made therein within the scope of the appended claims without departing from the spirit and scope of my invention.

Having thus described my invention, what I claim is:

1. In combination, a source of alternating current, a load, a rectifier connected with said source, switching means for at times connecting said load with the output circuit of said rectifier, a reserve source of direct current connected across the output circuit of said rectifier whereby said reserve source will supply said load upon failure of said alternating current source, an asymmetric unit interposed between said reserve source and said rectifier in such direction as to prevent the output current from said rectifier from flowing through said reserve source, and a shunt for said asymmetric unit closed by said switching means.

2. In combination, a source of alternating current, a load, a rectifier connected with said source, a reserve source of direct current connected across the output circuit of said rectifier, an asymmetric unit interposed between said reserve source and said rectifier in such direction as to prevent the output current from said rectifier from flowing through said reserve source, a relay, means controlled by said relay for connecting said load with the output circuit of said rectifier, and a shunt for said asymmetric unit controlled by said relay.

3. In combination, a source of alternating current, a load, a rectifier connected with said source, a reserve source of direct current connected across the output circuit of said rectifier, an asymmetric unit interposed between said reserve source and said rectifier in such direction as to prevent the output current from said rectifier from flowing through said reserve source, a relay, means controlled by said relay for connecting said load with the output circuit of said rectifier, and other means controlled by said relay for nullifying the effect of the resistance of said asymmetric unit.

4. In combination, a source of alternating current, a load, a rectifier connected with said source, means for at times connecting said load with the output circuit of said rectifier, a reserve source of direct current connected across the output circuit of said rectifier, an asymmetric unit interposed between said reserve source and said rectifier in such direction as to prevent the output current from said rectifier from flowing through said reserve source, and means for at said times short-circuiting said asymmetric unit to enable said reserve source to carry the load in the event of failure of said alternating current source.

5. In combination, a source of alternating current, a load, a rectifier connected with said source, an interlocking relay, means effective when either magnet of said interlocking relay is deenergized for connecting said load with the output circuit of said rectifier, a reserve source of direct current connected across the output circuit of said rectifier, an asymmetric unit interposed between said reserve source and said rectifier in such direction as to prevent current from said rectifier from flowing through said reserve source, and means effective when the said magnet is deenergized for closing a shunt path around said asymmetric unit.

6. Apparatus for preventing excessive voltage from being applied to a given load, comprising, in combination with a source of rectified alternating current for normally supplying current to said load and a reserve battery for at times supplying current to said load, an asymmetric unit interposed between said source and said battery in such direction as to prevent said rectified current from flowing through said battery, and means for short-circuiting said asymmetric unit to enable said battery to carry said load during failure of said source of rectified current.

7. In combination, a source of alternating current, a load, a rectifier connected with said source, means for connecting said load with the output circuit of said rectifier, a reserve source of direct current connected across the output circuit of said rectifier, an asymmetric unit interposed between said reserve source and said rectifier in such direction as to prevent the output current from said rectifier from flowing through said reserve source, and a circuit exclusive of said asymmetric unit for conducting current from said reserve source to said load in the event of a failure of said alternating current source.

8. In combination, a source of alternating current, a load, a rectifier connected with said source, means for connecting said load with the output circuit of said rectifier, a battery connected across the output circuit of said rectifier, an asymmetric unit interposed between said battery and said rectifier in such direction as to prevent the output current from said rectifier from flowing through said battery, and means exclusive of said asymmetric unit for supplying current from said battery to said load in the event of a failure of said alternating current source.

9. In combination, a source of alternating current, a load, a rectifier connected with said source and normally delivering a given output voltage, means for connecting said load with the output terminals of said rectifier, a reserve source of direct current connected across the output terminals of said rectifier, an asymmetric unit interposed in the circuit between said reserve source and said rectifier in such direction as to prevent the output current from said rectifier from flowing through said reserve source, the voltage of said reserve source being such that substantially no current is supplied from the reserve source to said load over said circuit unless the output voltage of said rectifier falls below said given value, and means effective for at times excluding said asymmetric unit from said circuit to cause said emergency source to supply current to said load provided the output voltage of said rectifier is at said times below said given value.

10. In combination, a source of alternating current, a load, a rectifier connected with said source and normally delivering a given output voltage, means for at times connecting said load with the output terminals of said rectifier, a reserve source of direct current connected across the output terminals of said rectifier, an asymmetric unit interposed in the circuit between said reserve source and said rectifier in such manner as to prevent the output current from said rectifier from flowing through said reserve source, the voltage of said reserve source being such that substantially no current is supplied from the reserve source to said load over said circuit unless the output voltage of said rectifier falls below said given value, and means exclusive of said asymmetric unit and effective at said times for causing current to be supplied to said load from said emergency source provided the output voltage of said rectifier is then below said given value.

11. In combination, a source of alternating current, a load, a rectifier connected with said source, a power-off relay energized from the output of said rectifier, means controlled by said power-off relay for connecting said load with the output circuit of said rectifier, a reserve source of direct current connected across the output circuit of said rectifier, an asymmetric unit interposed between said reserve source and said rectifier in such direction as to prevent the output current from said rectifier from flowing through said reserve source, and other means controlled by said power-off relay for connecting said load with said reserve source over a circuit which excludes said asymmetric unit.

12. In combination, a source of alternating current, a load, a rectifier connected with said source, an interlocking relay, a power-off relay, a pickup circuit for said power-off relay energized from the output of said rectifier and including a flagman contact of said interlocking relay, a holding circuit for said power-off relay energized from the output of said rectifier and including a front contact of the power-off relay, a reserve source of direct current connected across the output circuit of said rectifier, an asymmetric unit interposed between said reserve source and said rectifier in such direction as to prevent the output current from said rectifier from flowing through said reserve source, means including a back contact of said interlocking relay and controlled by said power-off relay for connecting said load with the output circuit of said rectifier, and other means controlled by said power-off relay for connecting said load with said reserve source over a circuit which excludes said asymmetric unit.

13. In combination, a source of alternating current, a load, a rectifier connected with said source, an interlocking relay, a power-off relay, a pickup circuit for said power-off relay energized from the output of said rectifier and including a flagman contact of each magnet of said interlocking relay, a holding circuit for said power-off relay energized from the output of said rectifier and including a front contact of the power-off relay and a resistor, a reserve source of direct current connected across the output circuit of said rectifier, an asymmetric unit interposed between said reserve source and said rectifier in such direction as to prevent the output current from said rectifier from flowing through said reserve source, means including a back contact of said interlocking relay and controlled by said power-off relay for connecting said load with the output circuit of said rectifier, and other means controlled by said power-off relay for connecting said load with said reserve source.

14. In combination, a source of alternating current, a load, a rectifier connected with said source, an interlocking relay, a power-off relay, a pickup circuit for said power-off relay energized from the output of said rectifier and including a flagman contact of each magnet of said interlocking relay, a holding circuit for said power-off relay energized from the output of said rectifier and including a front contact of the power-off relay and a resistor, a reserve source of direct current connected across the output circuit of said rectifier, an asymmetric unit interposed between said reserve source and said rectifier in such direction as to prevent the output current from said rectifier from flowing through said reserve source, means controlled by said interlocking relay for connecting said load with the output circuit of said rectifier, and means controlled by said power-off relay for connecting said load with said reserve source.

15. In combination, a source of alternating current, a rectifier connected with said source, a reserve source of direct current connected across the output circuit of said rectifier, an asymmetric unit interposed between said reserve source and said rectifier in such direction as to prevent the output current from said rectifier from flowing through said reserve source, a first load connected across the output circuit of said rectifier between said rectifier and said asymmetric unit whereby in the event of a failure of said alternating current source said first load will receive current from said reserve source through said asymmetric unit, a second load, switching means for connecting said second load across the output circuit of said rectifier, and a shunt for said asymmetric unit controlled by said switching means.

16. In combination, a source of alternating current, a rectifier connected with said source, a reserve source of direct current connected across the output circuit of said rectifier, an asymmetric unit interposed between said reserve source and said rectifier in such direction as to prevent the output current from said rectifier from flowing through said reserve source, a first load constantly connected across the output circuit of said rectifier between said rectifier and said asymmetric unit whereby in the event of failure of said alternating current source said first load will receive current from said reserve source through said asymmetric unit, a second normally deenergized load, switching means for connecting said second load across the output circuit of said rectifier, and a shunt for said asymmetric unit controlled by said switching means and effective when said second load is connected.

17. In combination, a source of alternating current, a rectifier connected with said source, a reserve source of direct current connected across the output circuit of said rectifier, an asymmetric unit interposed between said reserve source and said rectifier in such direction as to prevent the output current from said rectifier from flowing through said reserve source, a first load connected across the output circuit of said rectifier between said rectifier and said asymmetric unit whereby in the event of a failure of said alternating current source said first load will receive current from said reserve source through said asymmetric unit, a second load, switching means, a first circuit controlled by said switching means for conducting current from said rectifier to said second load, and a second circuit also controlled by said switching means and exclusive of said asymmetric unit for conducting current from said reserve source to said second load in the event of a failure of said alternating current source.

18. In combination, a source of alternating current, a rectifier connected with said source, a reserve source of direct current connected across the output circuit of said rectifier, an asymmetric unit interposed between said reserve source and said rectifier in such direction as to prevent the output current from said rectifier from flowing through said reserve source, a first load constantly connected across the output circuit of said rectifier between said rectifier and said asymmetric unit, a second normally deenergized load, switching means for connecting said second load across the output circuit of said rectifier, a power-off relay having a front contact included in the circuit for said second load, a pickup circuit for said power-off relay energized from the output of said rectifier and controlled by said switching means, a holding circuit for said power-off relay connected across the output circuit of said rectifier and independent of said switching means, and a circuit exclusive of said asymmetric unit and including a back contact of said power-off relay for energizing said second load from said reserve source in the event of a failure of said alternating current source.

SAMUEL G. RABER.